Nov. 17, 1942.    E. F. KINGSBURY    2,302,554
RADIATION PYROMETER
Filed April 29, 1939    2 Sheets-Sheet 1
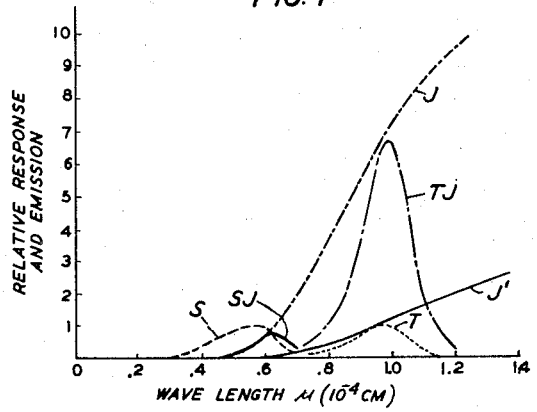
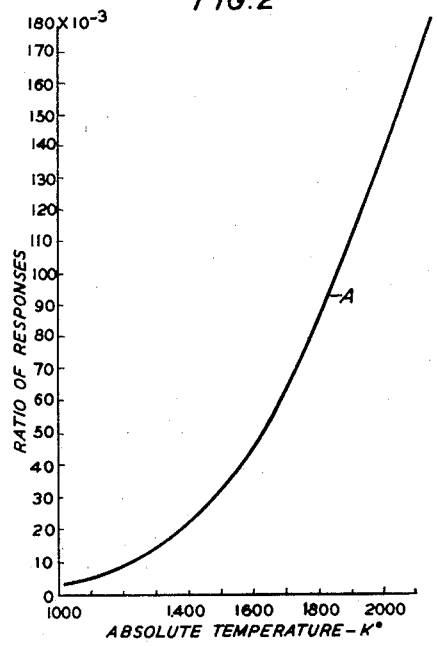
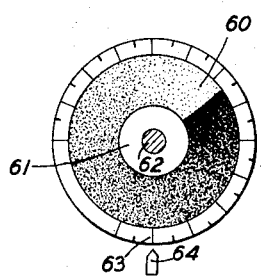
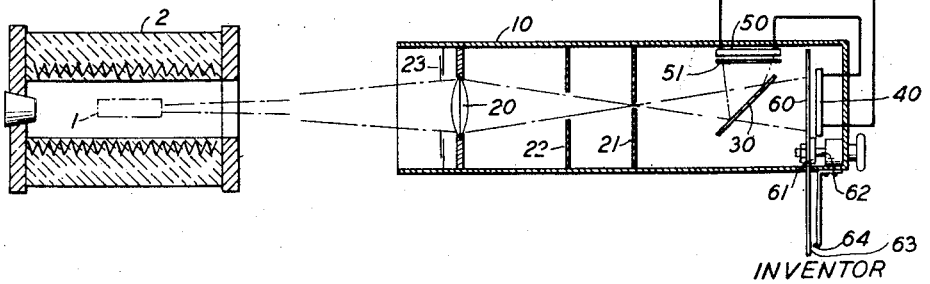
INVENTOR
E. F. KINGSBURY
BY
Stanley B. Kent
ATTORNEY Nov. 17, 1942.　　　　E. F. KINGSBURY　　　　2,302,554
RADIATION PYROMETER
Filed April 29, 1939　　　　2 Sheets-Sheet 2

INVENTOR
E. F. KINGSBURY
BY Stanley B. Kent
ATTORNEY

Patented Nov. 17, 1942

2,302,554

UNITED STATES PATENT OFFICE 2,302,554

RADIATION PYROMETER

Edwin F. Kingsbury, Rutherford, N. J., assignor to Bell Telephone Laboratories, Incorporated, New York, N. Y., a corporation of New York Application April 29, 1939, Serial No. 270,945

9 Claims. (Cl. 88—22.5)

This invention relates to radiation pyrometers and more particularly to photoelectric radiation pyrometers based on color temperature.

An object of this invention is to provide an improved photoelectric radiation pyrometer.

The principle underlying this invention is the simultaneous measurement of the relative radiations emitted by an incandescent source at two separated spectral regions utilizing radiation devices differentially connected and so controlled that their relative response becomes a measure of the temperature of the source. The temperature of an incandescent body can be measured by means of its emitted radiation in two ways. One of these is by utilizing the absolute intensity throughout either the entire spectrum or some restricted region. The other is by measuring the relative intensities emitted in two separated spectral regions. If the radiator is an ideal one, that is, if it is a black body, both methods are equally accurate and the choice becomes largely one of convenience. However, in practice radiators such as furnaces and incandescent surfaces depart more or less from the ideal condition and the method of measurement is dictated partially by considerations of accuracy. In such departures it is well known that methods based on absolute intensities suffer greater error than do those based on relative intensities. The embodiments of the invention described herein utilize the latter method and measure by simple means the color-temperature rather than some radiation or brightness temperature which the first method employs.

In an example of practice illustrative of this invention two radiant energy sensitive elements are employed, one element having a maximum or effective response at one wave-length position and the other element having its maximum or effective response at a different wave-length position in the spectrum from that of the first element, these radiant energy sensitive elements being simultaneously irradiated from a common source of radiant energy whose temperature is being measured. Radiation from a hot body whose temperature is to be measured is collected into a beam and the rays focussed by a suitable lens system in an aperture and upon passing therethrough the rays are divided into two beams and directed respectively to two photoelectric cells, one part to a selenium photo-E. M. F. cell and the other part to a thallium sulfide photo-E. M. F. cell. The cells are electrically connected in opposing relation to an electric meter or in any other suitable differential arrangement. To obtain temperature indications, the electrical responses of the cells are preferably balanced against each other by adjusting the intensity of the radiation impinging upon one of the cells, the selenium cell, for example, by means of a suitable absorption member or wedge positioned in the path of the rays directed to this cell. A null indication on an electric meter indicates a balance of the responses and by means of a calibrated scale attached to the absorption member, the temperature of the hot body is shown. Modified arrangements and applications of the pyrometer are described hereinafter.

An advantage of a radiation pyrometer based on color-temperature is that such an instrument indicates more clearly the true temperature of the radiator than other types of pyrometers. This is due fundamentally to the fact that the distribution of the intensity throughout the spectrum changes less in form than in absolute magnitude for incandescent radiators of practical interest. The measurement of the relative response at two points therefore determines the form or shape of the emission curve and thereby the so-called color-temperature. In this method, it is desirable to utilize two spectral wave-lengths or regions that are separated considerably since there is a greater variation of the ratio of response for a given temperature change and the practical accuracy of the method is thereby enhanced.

The color-temperature of a hot body is defined as the temperature of a black body which matches its color.

Other advantages of this pyrometer are high sensitivity, a high degree of accuracy, wide range of temperature measurement, the absence of any exterior factor such as the human eye for matching colors or intensity of the radiations from the hot body whose temperature is measured. This pyrometer requires no battery and in any of its modifications it is very simple.

A more detailed description of arrangements chosen for illustrating this invention follows.

Fig. 1 shows relative equienergy spectral response curves of two different types of photoelectric cells, namely, the selenium and the thallium sulfide photo-E. M. F. cells, the spectral emission of a black body at 2000° K. and the spectral response to its emission by each of the cells.

Fig. 2 shows the ratio of response of selenium and thallium sulfide photo-E. M. F. cells at various absolute temperatures.

Fig. 3 shows schematically the elements of a pyrometer in accordance with the principles of this invention.

Fig. 3A shows details of the rotatable light-wedge arrangement of Fig. 3.

Figure 4:
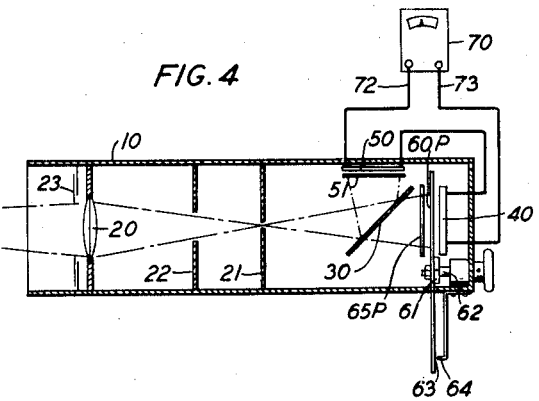
Figs. 4 and 4A show modifications of the pyrometer arrangement of Fig. 3 to use a "Polaroid" unit.

Fig. 1 is a typical set of curves showing the relative equienergy spectral response of two different photoelectric cells, the spectral emission of a black body at a temperature 1600° K. and at 2000° K. and the resulting response of each cell when excited by radiation from the black body at 2000° K. These curves are plotted with wave-lengths along the abscissae and relative response and emission along the ordinates. Curve S shows the relative equienergy spectral response of a selenium cell over the range of the spectrum to which it is sensitive. Its range of response is between wave-lengths of about 0.3 to 0.7 micron and its maximum response occurs at about 0.57 micron which is in the yellow-green portion of the spectrum. Curve T similarly shows the relative spectral response of a thallium sulfide cell. Its range of response is between wave-lengths of about 0.7 to 1.15 microns and its maximum response occurs at about 0.98 micron which is in the infra-red portion of the spectrum. Each of these curves shows the relative rather than the absolute response for various wave-lengths in the spectrum to which the cells are sensitive. In each case the maximum response is considered as unity and the relative response for other parts of each respective curve is shown with respect to this maximum. These two curves do not show the energy output of the two cells for if the curves were so plotted the ordinates for the two curves would be quite different. Curve J for a black body at a temperature of 2000° K. shows the emission over a band of wave-lengths to which both the selenium and the thallium sulfide cells respond. The emission of such a hot body is comparatively low in the region of wave-lengths of about 0.5 micron and becomes very high in the region of about 1.1 microns. From this curve it is obvious that such a hot body will cause a comparatively small response in the shorter wave-lengths region in the selenium cell and a much greater response in the longer wave-lengths region in the thallium sulfide cell provided they are more or less equal in absolute sensitivity. The resultant responses of the cells is shown by multiplying the relative responses of the cells by the emission from the black body. Such resultant curves for each cell irradiated by a black body at 2000° K. are shown, that marked SJ is for the selenium cell and that marked TJ is for the thallium sulfide cell. The heights and areas of these two curves, obviously from what has been stated above, do not indicate the absolute differences in response of the two cells, but are merely illustrative as the ordinates are not shown in absolute units. It is the ratio of these two resulting responses that is used in this pyrometer to indicate the temperature of a hot body. This ratio of emissions for a hot black body is different for different temperatures and consequently the resultant ratio of responses of the two cells is different at different temperatures of the hot body. To illustrate this a second curve J' for a black body at a temperature of 1600° K. is shown for comparison with that at a temperature of 2000° K. From this it is obvious that the resultant responses of the two cells when irradiated by a hot body at different temperatures will vary according to the differing characteristics of the emission curves and consequently the ratio of the responses will vary for different temperatures.

Fig. 2 shows typical curve A of the ratio of the responses of selenium and thallium sulfide photo-E. M. F. cells at various absolute temperatures. This curve is a plot of $$\frac{R_s}{R_t} \text{ vs } T$$

where $R_s$ is the response of the selenium cell, $R_t$ is that of the thallium sulfide cell, and $T$ the absolute temperature. The ratio of these responses, as shown by this curve, is different for different temperatures, and due to this fact various temperatures of a hot body may be ascertained by measuring the relative responses of two differently responding photoelectric cells and this fact is employed in the pyrometer of this invention as heretofore stated.

For photoelectric pyrometry it is not necessary to restrict the two effective wave-lengths to visible wave-lengths giving an integral color match, but those appropriate to the responses of the cells which are employed in the apparatus, can be used as, for example, 0.62 and 1.0 micron for the selenium and the thallium sulfide cells, respectively.

Different types of radiant energy sensitive cells vary greatly in their effective color response. It is to be noted, however, that two similar light sensitive elements whose spectral responses are similarly distributed but whose effective responses are altered by means of suitable filters for causing the respective responses to occur at different frequency positions in the spectrum may be used. Either one or both such light sensitive elements may be equipped with a filter.

In this arrangement the two light sensitive cells have spectral response characteristics such that the ratio of their responses over a wide range of color-temperature varies continuously in the same direction, either increasingly or decreasingly as the temperature varies from one limit to the other. The greater the change per degree of temperature change the greater will be the sensitivity of the pyrometer.

Fig. 3 shows schematically a photoelectric radiation pyrometer based on color-temperature in which either two light sensitive elements inherently having their respective effective responses at different wave-lengths, or two similar light sensitive elements whose spectral responses are similarly distributed, but whose effective responses are altered by means of suitable filters for causing their respective responses to occur at different portions of the spectrum, are used. In using two similar light sensitive elements, either one or both may be equipped with a filter. The drawing and the following description for the sake of simplicity specifically consider the arrangement with the cells inherently having differently positioned maximum and effective responses. Also, while for illustration the two light sensitive elements are designated as the selenium and the thallium sulfide cells, other types may be used. These two types are well adapted to this combination as their respective maximum responses occur at quite different wavelength positions in the spectrum as disclosed in the description of Fig. 1 and also because they are photo-E. M. F. cells which obviate the use of a battery in the circuit of the system. The optical elements of the pyrometer are mounted in a suitable tubular housing 10. A collecting lens 20 projects an image of a small area of the hot body 1 whose temperature is to be measured, which is shown within the heating chamber of an ordinary electric furnace 2 at a suitable distance from the pyrometer, on the plane of an aperture 21 back of which is positioned a suitable semitransparent dividing mirror 30 which allows a part of the light to pass through it to the selenium cell 40 and directs the remaining part to the thallium sulfide cell 50. The points from which the radiations are emitted from the hot body 1 and the aperture 21 are at conjugate foci of lens 20. The diaphragm 22 has an aperture somewhat larger than the beam passing through it and this diaphragm prevents scattered light or radiations from reaching the cells. In this arrangement both of the light sensitive cells are simultaneously irradiated. It is essential that both cells be irradiated from the same area of the source which is taken care of by the requirement that the uniform and hottest area is imaged on and fills the aperture common to them. The two light sensitive cells 40 and 50 are electrically connected in series-opposing relationship or differentially to an electrical relay or measuring instrument 70 by conductors 72 and 73. An adjustable iris diaphragm 23 positioned in the plane of the lens 20 or as near thereto as practicable may be employed to limit the magnitude of the radiation reaching the cells and thus largely eliminate any differences due to the shapes of the illumination-response characteristics of the two cells from the temperature measurements, and also to extend the useful temperature range of the pyrometer. In this manner it is possible to keep the current or voltage output of the cells within desired regions. When the temperature of a hot body changes, it is well known that both the intensity and the color of the emitting radiator change. The output of a photoelectric cell is also affected by both of these factors. If the relation between intensity and photoresponse is a linear one for each cell, the absolute magnitudes of the responses due to this factor are immaterial since they are relatively always the same. However, when the intensity-response relation is non-linear, it may then become desirable to work on a restricted illumination region of the cells which can be accomplished in the manner described above for maintaining similar illumination-response characteristics. With this arrangement the "spectral or color-temperature" of the hot body may be measured by balancing the exposures of the two cells by a variable absorption shutter or wedge member 60, positioned in front of one of the cells and controlling a calibrated scale. The absorption wedge 60 mounted on support 61 which does not obstruct the optical portion of the wedge, may be either reciprocable or rotatable and is here shown as rotatable on shaft 62. A plan view of the wedge unit is shown in Fig. 3A. The scale 63 calibrated to indicate temperatures may be attached to the wedge near its edge or circumference so as to move with it and a fixed pointer 64 indicates the temperature readings. A balance of the exposures of the two cells is indicated by a null indication of electrical meter 70. When the response of the two cells is balanced by adjusting the absorption wedge 60, the temperature of the hot body is directly shown by the calibrated scale controlled by the position of the absorption wedge 60.

While light sensitive cell 40 has been designated as a selenium cell and 50 as a thallium sulfide cell, it is not essential which positions these cells occupy. This is determined by the characteristics of the transparent dividing mirror 30 which can be a semitransparent metallic mirror on glass. Such a mirror, especially of gold, reflects the infra-red rays better than the visible so that the thallium sulfide cell is naturally placed in the path of the reflected radiations. An appropriate fixed absorbing screen 51 in front of the thallium sulfide cell may be used to obtain the desired initial relative exposures of the two cells. The position of this absorbing screen 51 is not changed in making temperature measurements. Also, the variable absorption wedge 60 may be positioned in front of either light sensitive cell.

Figure 4A:
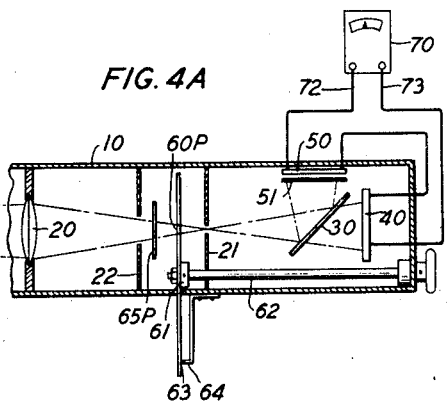

Figs. 4 and 4A show modified arrangements for balancing the exposures of the two photocells in which, in place of the usual light absorption wedge, a "Polaroid" unit is employed for varying the relative amounts of radiation reaching the two cells. "Polaroid" is made of a material like quinine iodosulphate and has the property of polarizing light. A polarizing unit is made up of two relatively adjustable parts, a polarizer and an analyzer. By means of this unit, controlled amounts of light may be transmitted. It is effective particularly in the range of the spectrum between the infra-red and the blue portions but is largely transparent and ineffective as a polarizer in the infra-red. It is, therefore, preferably employed in the path of the radiations reaching the selenium cell. In the modified arrangement a rotatable "Polaroid" disc 60P is substituted for the absorption wedge 60 and a stationary "Polaroid" element 65P is positioned in optical alignment in front of the selenium cell so that both are in the path of the radiations reaching this cell, as shown in Fig. 4. The elements of this polarizing unit may be differently positioned, for example, the rotatable "Polaroid" disc 60P may be positioned nearer the lens 20 while the stationary "Polaroid" element 65P may be positioned in the same common beam, as shown in Fig 4A, or immediately in front of the selenium cell. The positioning of the "Polaroid" element in the common beam is possible because "Polaroid" is practically transparent and without effect in the infra-red where the thallium sulfide cell is responsive, while on the other hand, it cuts off the visible light to which the selenium cell responds. If the two cells have equal response, say at 1200° K., then at a higher temperature the selenium will give more response necessitating a reduction in its irradiation. Any residual disturbance of the illumination on the thallium cell or effective polarization by the mirror can be allowed for in the calibrating of the scale in the arrangement employing the "Polaroid" unit.

In the arrangement as described above, the relative amounts of radiation reaching the cells may be varied by a suitable variable absorption element or polarizing unit to cause the responses of the two cells to equal or balance each other and by calibration of an indicating scale associated with the variable element, the temperature is directly shown for every balance setting.

However, for a given setting of the variable absorption unit this arrangement may be made self-indicating within a comparatively narrow range by calibrating the scale of the electrical meter so that its indications show the temperatures directly. Such an arrangement, however, is not as desirable as that in which the responses of the two cells are balanced for each temperature reading.

Continuous temperature indications may be automatically obtained by methods well known to the art by using the electrical instrument 70 as a relay to control mechanism which in turn automatically adjusts the absorption unit so that the responses of the cells are quickly balanced at all times and the scale associated with the absorption unit then continuously indicates the temperature.

Figure 5:
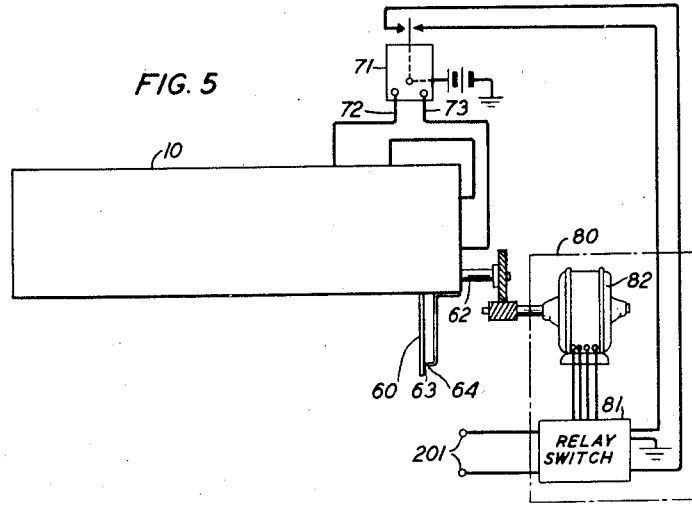
Fig. 5 is a schematic drawing showing the pyrometer arranged for continuous temperature indication.

Fig. 5 shows the pyrometer arranged for continuous temperature indications. The electrical relay 71 is equipped with contacts connected in a local circuit leading to an automatic adjusting mechanism 80 consisting of a motor control relay reversing switch mechanism 81 governing the operation of motor 82 which is geared to the rotatable member 60 of the absorption unit. The automatic adjusting mechanism 80 may be of any well-known type such as shown in Patent 1,703,142 issued to E. I. Green, February 26, 1929. When the responses of the photoelectric cells of the pyrometer are balanced the contacts of relay 71 are open and the motor 82 is at rest. A change of temperature of the irradiating body causes an unbalance and one or the other of the contacts of relay 71 closes which, in turn, causes the operation of motor 82 in a direction to rotate the movable member 60 of the absorption unit to rebalance the photoelectric cells when the relay 71 again takes its neutral or open circuit position and the motor 82 stops. Power for operating the motor and the reversing switch mechanism of the adjusting mechanism 80 may be supplied through circuit connection 201. The absorption unit is thus automatically adjusted in either direction depending upon whether the temperature of the irradiating body is rising or falling and continuous temperature indication is obtained and indicated by the scale 63.

The non-adjusting or non-self-indicating pyrometer arrangement may be used for automatic control at a given temperature setting by substituting for the electrical meter a relay equipped for controlling the temperature control mechanism associated with a furnace or other heating device.

Figure 6:
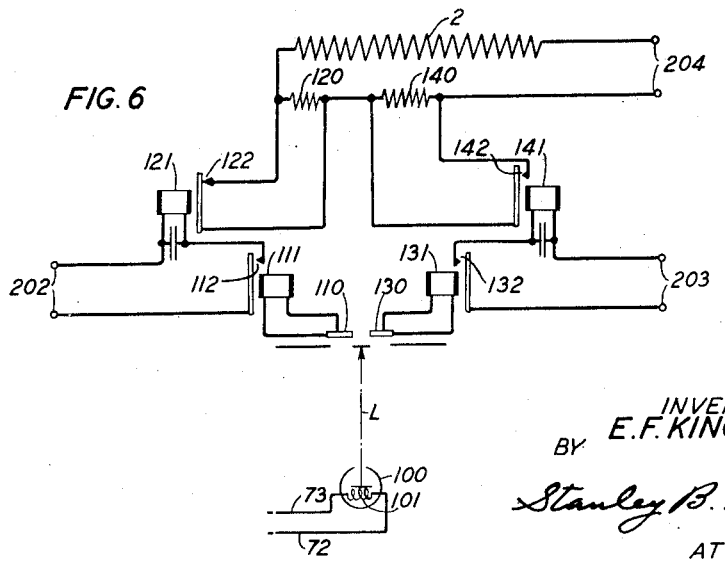
Fig. 6 shows a circuit arrangement for applying the pyrometer to automatically control furnace temperature.

Fig. 6 shows a circuit arrangement for applying the pyrometer to automatically control furnace temperatures. The winding 101 of galvanometer 100, schematically shown in the drawing, is connected to conductors 72 and 73 of the output circuit of the pyrometer and by means of a light beam L deflected either to the left or the right of its neutral position by the operation of the galvanometer one or the other of two photo-electrically energized relay circuits is caused to operate, which in turn controls other relay apparatus arranged to cause a decrease or an increase in the furnace current. When the light beam L from the galvanometer relay 100 moves to the left it impinges on photoelectric cell 110 and energizes relay 111 which closes its contacts 112 and causes energization of relay 121 whose contacts 122 in turn open and remove the short circuit from resistance 120 which is in series with the heating element of the electric furnace 2. This reduces the current going through the furnace and consequently its temperature. When the light beam L of the galvanometer relay 100 moves to the right it impinges on photoelectric cell 130 and energizes relay 131 which closes its contacts 132 and causes energization of relay 141 whose contacts 142 in turn close and short-circuit the resistance 140 in series with the heating element of the furnace 2 thus increasing the current flow therethrough and causing a rise in the furnace temperature. The two circuits associated with the light sensitive cells 110 and 130 are practically identical except that the contacts on relay 121 are normally closed when non-operated, while on the corresponding relay 141 the contacts are open when in non-operated position. These two relays can be replaced by or can in turn control mercury tilting switches connected in the same manner to the control resistances. Any suitable source of power may be used for operating the main relay switches by connection with circuits 202 and 203 and for supplying power to the electric furnace or other current consuming device by connection with circuit 204. In the operation of this arrangement the light beam from the galvanometer relay 100, which is connected in the photoelectric cell circuit of the pyrometer, is positioned in a neutral position when the furnace is at the desired temperature so that it does not impinge upon either of the light sensitive cells 110 and 130. The pyrometer then obviously will automatically cause an increase or a decrease in the current supplied to the furnace as required to maintain it at substantially constant temperature.

What is claimed is:

1. A photoelectric radiation pyrometer comprising two radiant energy sensitive elements, an opaque member having an aperture, a lens system for collecting radiations from a body whose temperature is to be measured and focussing a beam of said radiations at said aperture, said aperture being of a size to transmit only radiations focused thereon by the lens, optical deflecting means positioned in and dividing said beam after passing through said aperture into two channels in which said sensitive elements are respectively positioned, an optical member having varying absorption positioned in one of said channels, means for adjusting said absorbing member for controlling the amount of radiation reaching one of said sensitive elements, and an electric instrument connected in the output circuit of said sensitive elements for indicating the relative response of said sensitive elements.

2. A photoelectric radiation pyrometer comprising a selenium photo-E. M. F. cell and a thallium sulfide photo-E. M. F. cell, an opaque member having an aperture, a lens for collecting radiations from a body whose temperature is to be measured and focussing a beam of said radiations at said aperture, said aperture being of a size to transmit only radiations focused thereon by said lens, optical deflecting means positioned in and dividing said beam after passing through said aperture into two channels in which said cells are respectively positioned, an optical member having varying absorption positioned in one of said channels, means for adjusting said absorbing member for controlling the amount of radiation reaching one of said cells, and an electric instrument connected in the output circuit of said cells for indicating the relative response of said cells.

3. A photoelectric radiation pyrometer comprising two radiant energy sensitive elements, an opaque member having an aperture, a lens system for collecting radiations from a body whose temperature is to be measured and focussing a beam of said radiations at said aperture, said aperture being of a size to transmit only radiations focused thereon by said lens, a diaphragm having an opening of adjustable size positioned with its opening in the path of said beam for controlling the amount of the radiation flux, optical deflecting means positioned in and dividing said beam after passing through said aperture into two channels in which said radiant energy sensitive elements are respectively positioned, an optical member having varying absorption positioned in one of said channels, means for adjusting said absorbing member for controlling the amount of radiations reaching one of said sensitive elements, and an electric indicating instrument connected in the output circuit of said sensitive elements for indicating the relative response of said sensitive elements.

4. A photoelectric radiation pyrometer comprising two radiant energy sensitive cells having different response characteristics, an opaque member having an aperture, a lens system for collecting radiations from a body whose temperature is to be measured and focussing a beam of said radiations at said aperture, said aperture being of a size to transmit only radiations focused thereon by said lens, optical deflecting means positioned in and dividing said beam after passing through said aperture into two channels in which said cells are positioned, a polarizing unit capable of varying the intensity of the radiations passing therethrough positioned in said beam, means for adjusting said polarizing unit for controlling the relative amounts of radiation reaching said cells, and an electric instrument connected in the output circuits of said cells for indicating the relative response of said cells.

5. A photoelectric radiation pyrometer comprising two radiant energy sensitive cells, an opaque member having an aperture, a lens system for collecting radiations from a body whose temperature is to be measured and focussing a beam of said radiations at said aperture, said aperture being of a size to transmit only radiations focused thereon by said lens, optical deflecting means positioned in and dividing said beam after passing through said aperture into two channels in which said cells are positioned, an optical member having varying absorption positioned in one of said channels, automatic driving means for adjusting said absorbing member for controlling the relative amounts of radiation reaching said cells, and electric relay means connected in the output circuit of said cells for controlling said automatic driving means for balancing the relative response of said cells.

6. A photoelectric radiation pyrometer comprising two radiant energy sensitive elements, means for causing said elements at similar wave-length regions in the spectrum to respond with different intensities, respectively, means for simultaneously irradiating both of said elements with the same spectral frequency band from a common source of radiant energy whose temperature is to be measured comprising means forming the utilized radiant energy into a beam having a common portion and a divided portion, means controlling the radiant energy to both of said elements at a point in the common portion of said beam for maintaining the amount of radiant energy reaching one of said elements at a reference value, and additional adjustable radiation transmitting means for relatively adjusting the radiations reaching said elements.

7. A photoelectric radiation pyrometer comprising an opaque housing having an opening therein, an objective lens filling said opening, an adjustable iris diaphragm for said lens, an opaque partition separating said housing into two compartments, said partition having an aperture in the plane of one conjugate focus of said lens when that portion of the hot body the temperature of which is to be measured is at the other corresponding conjugate focus, said aperture being of a size to transmit only light rays focused thereon by said lens, a semitransparent mirror in the compartment of said housing remote from said lens, said mirror extending across the path of the light beam entering said compartment through said aperture from said lens and the reflecting surface of said mirror being positioned at an angle to the axis of said lens, a selenium photo-E.M.F. cell located in the path of the beam transmitted through said mirror, a thallium sulfide photo-E.M.F. cell located in the path of the beam reflected by said mirror, both cells being located in the same compartment with said semi-transparent mirror, a light absorbing device having varying light transmission characteristics located between said mirror and said selenium cell, an electrical instrument having a zero-center position, circuit connections connecting said cells in opposing relationship to said instrument, and means outside said housing to adjust said light absorbing device.

8. A photoelectric radiation pyrometer comprising a tubular housing, a first transverse partition intermediate the ends of said housing having an aperture coincident with the axis of said housing, a second transverse partition near one end of said housing having a central opening therein, a collecting lens in said opening the axis of which lens is coincident with the axis of said housing, one conjugate focus of said lens being at the aperture in said first transverse partition when the corresponding conjugate focus is at the portion of the body whose temperature is to be measured, an adjustable iris diaphragm adjacent said lens on the side toward the focus at said body, a closure for the end of said housing remote from said lens, a selenium photo-E.M.F. cell central of said tubular housing and adjacent said closure having a maximum response to radiation from a black body at 2000° K. at a wave-length of approximately 0.62 of a micron, said first transverse partition being about midway between said lens and said selenium cell and the aperture in said partition being small enough so that all straight lines from said lens through said aperture are intercepted by said selenium cell and only large enough to transmit the rays focused thereon by said lens, a semitransparent dividing plane mirror between said first partition and said selenium cell the reflecting face of which lies at an angle of 45° to the axis of said housing and intercepts some of the rays from all parts of the cross-section of the light beam passing from said lens through the aperture in said first partition, a thallium sulfide photo-E.M.F. cell at one side of but within said tubular housing arranged to receive all the light rays reflected from said mirror and having a maximum response to radiation from a black body at 2000° K. at a wave-length of approximately 1.0 micron, a third transverse partition between said lens and said first partition having a central aperture slightly larger than the cross-section at the plane of said central aperture of the light beam passing from said lens through the aperture in said first partition, a fixed absorbing screen in front of said thallium sulfide cell to provide a desired initial relative exposure of said two cells, a polarizing shutter unit in front of said selenium cell comprising a stationary sheet of polarizing material comprising quinine iodosulphate and a rotatable sheet of the same material, partially within and partially without said tubular housing, means to rotate said rotatable sheet, a zero-center ammeter, electrical connections between said ammeter and said cells connecting said cells in series-opposing relationship to said ammeter, and a fixed scale on said rotatable sheet indicating temperature of the body under test when said sheet is positioned to give a null reading on said ammeter.

9. A photoelectric radiation pyrometer comprising a selenium photo-E.M.F. cell and a thallium sulfide photo-E.M.F. cell, an opaque member having an aperture, a lens for collecting radiations from a body whose temperature is to be measured and focusing a beam of said radiations at said aperture, said aperture being of a size to transmit only radiations focused thereon by said lens, optical deflecting means positioned in and dividing said beam after passing through said aperture into two channels in which said cells are respectivey positioned, an optical member having varying absorption positioned in one of said channels, means for adjusting said absorbing member for controlling the amount of radiation reaching one of said cells, and an electric instrument connected in the output circuit of said cells for indicating the relative response of said cells, wherein the means for adjusting said absorbing member for controlling the relative amount of radiations reaching said cells is automatically operated, and said electric instrument is electric relay means connected in the output circuit of said cells for causing said automatic adjusting means to maintain a balance of the relative response of said cells.

EDWIN F. KINGSBURY.